United States Patent
Mannari et al.

(10) Patent No.: US 9,783,394 B2
(45) Date of Patent: Oct. 10, 2017

(54) GRABBER FOR LOAD HANDLING APPARATUS AND CRANE

(71) Applicant: KONECRANES GLOBAL CORPORATION, Hyvinkää (FI)

(72) Inventors: Ville Mannari, Vantaa (FI); Ari Nieminen, Hyvinkää (FI); Jussi Lehtiö, Turenki (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 0 days.

(21) Appl. No.: 14/785,178

(22) PCT Filed: Apr. 17, 2014

(86) PCT No.: PCT/FI2014/050285
§ 371 (c)(1),
(2) Date: Oct. 16, 2015

(87) PCT Pub. No.: WO2014/170554
PCT Pub. Date: Oct. 23, 2014

(65) Prior Publication Data
US 2016/0107865 A1    Apr. 21, 2016

(30) Foreign Application Priority Data
Apr. 17, 2013    (FI) .................. 20134096 U (51) Int. Cl.
*B65F 9/00*    (2006.01)
*B65G 67/00*    (2006.01)
(Continued)

(52) U.S. Cl.
CPC .............. *B66C 13/16* (2013.01); *B66C 1/101* (2013.01); *B66C 1/42* (2013.01); *B66C 13/085* (2013.01);
(Continued)

(58) Field of Classification Search
CPC .. B66C 13/16; B66C 1/42; B66C 1/24; B66C 1/101; B66C 13/085; B66C 13/46;
(Continued)

(56) References Cited

U.S. PATENT DOCUMENTS 3,536,350 A    10/1970    Backteman
4,139,107 A    2/1979    Ninomiya et al.
(Continued)

FOREIGN PATENT DOCUMENTS

CN    2484295 Y    4/2002
CN    103010964 A    4/2013
(Continued)

OTHER PUBLICATIONS

EP0668236A1 English Translation.*
Russian Office Action dated Jun. 13, 2017 with English translation.

*Primary Examiner* — Stephen Vu
(74) *Attorney, Agent, or Firm* — Birch, Stewart, Kolasch & Birch, LLP (57) ABSTRACT

A grabber for a load handling apparatus having an optical distance measuring device and a fastening mechanism that fastens the optical distance measuring device in a flexible manner to the grabber. The grabber may be provided in a crane, such as a boom crane, a bridge crane, a container crane or a gantry crane.

24 Claims, 5 Drawing Sheets

(51) Int. Cl.
  *B66C 13/16* (2006.01)
  *G01S 17/42* (2006.01)
  *G01S 7/481* (2006.01)
  *B66C 1/10* (2006.01)
  *B66C 13/08* (2006.01)
  *B66C 13/46* (2006.01)
  *B66C 1/42* (2006.01)

(52) U.S. Cl.
  CPC ............ *B66C 13/46* (2013.01); *G01S 7/4813* (2013.01); *G01S 17/42* (2013.01)

(58) Field of Classification Search
  CPC ........ G01S 17/42; G01S 7/4813; B25J 15/00; B25J 15/0009; B25J 15/026; B25J 15/0253; B25J 15/10; B25J 15/0028; B25J 19/02; A01D 87/003; B66F 9/181; B66F 9/183; B66F 9/18; B66F 9/188; B66F 9/195; B65G 57/00; B65G 57/18; B65G 61/00; B65H 31/30; H01L 21/67259; H01L 21/6773; H01L 21/67733; H01L 21/68707; B25B 9/00; B65B 5/068
  See application file for complete search history.

(56) References Cited

U.S. PATENT DOCUMENTS

| | | | |
|---|---|---|---|
| 6,124,932 A * | 9/2000 | Tax | B66C 13/46 |
| | | | 212/285 |
| 2002/0024598 A1* | 2/2002 | Kunimitsu | B66C 13/46 |
| | | | 348/159 |
| 2002/0191813 A1* | 12/2002 | Uchida | B66C 13/085 |
| | | | 382/100 |
| 2003/0201394 A1 | 10/2003 | Peoples | |
| 2011/0140470 A1* | 6/2011 | Mills | B66C 1/101 |
| | | | 294/81.41 |

FOREIGN PATENT DOCUMENTS

| | | |
|---|---|---|
| DE | 29510031 U1 | 10/1995 |
| EP | 0440915 A1 | 8/1991 |
| EP | 0668236 A1 | 8/1995 |
| EP | 1695936 A1 | 8/2006 |
| JP | 2006-273532 A | 10/2006 |
| NL | 157868 C | 12/1980 |
| RU | 124 256 U1 | 1/2013 |
| WO | WO 03/091697 A2 | 11/2003 |
| WO | WO 2012/074771 A2 | 6/2012 |

\* cited by examiner

GRABBER FOR LOAD HANDLING APPARATUS AND CRANE

FIELD OF THE INVENTION

The invention relates to a grabber for load handling apparatus. In the context of this invention, a crane refers to a device capable of lifting and handling loads, such as containers, under the control of man and/or automation. A particular application of the invention is distance measurement to a load to be handled or to objects around a load to be handled.

BACKGROUND OF THE INVENTION

The majority of international transport of goods takes place by means of containers. Containers are standard-shaped transport units in which goods are packed for the duration of transport. Typically, containers come in three different sizes of 20 feet, 40 feet or 45 feet in length. A container is about 2.5 meters wide.

Containers are handled at a container terminal (either in ports or inland) by particular container cranes, which include rail mounted gantry cranes (RMG cranes) and rubber-tyred gantry cranes (RTG cranes). A particular type of rail mounted gantry crane in a container port is a ship-to-shore crane used for lifting containers to be unloaded from a ship onto a quay and, correspondingly, for loading containers brought to a quay on board a container ship.

For handling containers a container crane typically has a specific container grabber (spreader) mounted thereto for gripping and lifting a container. The length of a spreader may be altered according to the length of the container being handled.

When containers are handled, they are typically loaded one on top of the other or carried from one stack to another. Stacking of containers requires great precision. The stacks may have a plurality of containers, e.g. five, and therefore imprecisions in the stacking of the containers may cause the entire stack to collapse and thus endanger the staff and equipment around the stack.

When containers are handled, the grabber may be subjected to vibration and collisions from various sources. Vibration and collisions typically occur for example when the grabber is placed on top of a container and it grabs the container. Vibration and collisions complicate the positioning of containers with sufficient precision. On the other hand, attenuation of vibration may take a long time, which delays container handling and decreases the efficiency of the handling. Collisions may take place at an acceleration of the order of 1000 m/s$^2$, i.e. about 100 G.

Crane operation is increasingly automated to speed up container handling. In automated container handling the driver may monitor the handling on a display in the crane cabin or over a remote connection from an office, for example. The driver does not need to monitor the handling all the time, but the automation system may alert the driver when his/her attention is required. Since the driver does not have a direct visual contact with the container to be handled, precise operation and reliability of the equipment to be used for automated handling are an essential aspect with regard to the efficiency of container handling. Servicing or malfunction of the automation equipment causes service breaks in the crane operation and prevents handling of containers. From the point of view of the crane owner, service breaks are expensive and cause congestion in container handling at a crane terminal, for example.

BRIEF DESCRIPTION OF THE INVENTION

It is thus an object of the invention to provide a method and an apparatus implementing the method so that at least one of the above problems may be alleviated or removed. The object of the invention is achieved by a grabber and a crane characterized by what is stated in the independent claims. Preferred embodiments of the invention are disclosed in the dependent claims.

According to an aspect of the invention, a grabber for a load handling apparatus comprises an optical distance measuring device and fastening means that fasten the optical distance measuring device to the grabber in a flexible manner. The flexible fastening to the grabber reduces forces directed from the grabber to the optical distance measuring device, which enables failures to the distance measuring device to be prevented. Since the optical distance measuring device is connected to the grabber, the distance measuring device is close to the load, such as a container, to be handled and thus the handling of the container with the grabber may be carried out with precision. The flexible fastening reduces vibration of the optical measuring device, and a substantially constant-level precision in the container handling is sustained also for longer periods, despite impact-type loads caused by the moving of many containers.

According to an aspect, a crane, such as a boom crane, bridge crane, container crane or gantry crane, comprises a grabber according to any one of the inventive aspects. Thanks to the flexible fastening of the optical measuring device, it is possible to reduce the number of crane service breaks, which increases crane handling efficiency. In addition, a crane according to the aspect enables advantages of a grabber according to an aspect to be achieved in the handling of a load, such as a container.

Further advantages are disclosed in the specification below.

BRIEF DESCRIPTION OF FIGURES

The invention will now be explained in greater detail in connection with preferred embodiments and with reference to the attached drawings, in which.

DETAILED DESCRIPTION OF THE INVENTION

In this application directions upward and downward may be determined according to the direction of gravity. Thus downward refers to a direction to which gravity, i.e. earth gravity, acts. Hence downward surfaces, such as undersides, face the ground or a structure, such as a floor, resting on the ground. Upward, in turn, refers to a direction opposite to the direction in which the gravity acts. Hence upward surfaces, such as top surfaces, face a direction away from that in which the gravity acts. When containers are handled by a grabber, the containers are usually handled at least in a vertical direction, in which case they are lowered down when being stacked onto the ground or on top of another container and lifted up when being grabbed and the container is lifted upward for transporting it to a new site.

A number of embodiments disclose a grabber for a load handling apparatus. The grabber has an optical distance measuring device and fastening means that fasten the optical distance measuring device to the grabber in a flexible manner. Due to the flexible fastening, grabber automation and/or automation of a load handling apparatus comprising the grabber, which was impossible before because of lack of skill or courage, is now possible to implement.

With the flexible fastening the optical measuring device can be fastened to the grabber despite repeated impacts to the grabber during the handling of a load, such as containers, during work cycles. The impacts may take place at an acceleration of the order of 1000 m/s$^2$, i.e. about 100 G. Optical distance measuring devices, such as laser scanners, typically have an impact resistance of the order of 10 to 15 G. In other words, impacts to the grabber during load handling exceed the impact resistance values of optical distance measuring devices. High accelerations are caused e.g. by the grabber swaying at the end of long ropes, the sway being possibly increased by driving movements of the load handling apparatus, such as a crane, such as movements of the top fastening points of the hoisting ropes and those of the lifting machineries during positioning. Positioning may be complicated by the crane driver's disadvantageous view angle to each container location and height. Tests have shown that the flexible fastening disclosed in the plurality of embodiments enables sensors of conventional impact resistance to be mounted to the grabber in permanent use.

It is to be noted that an optical distance measuring device fastened to the grabber in a flexible manner is capable of distance measurement on a continuous basis or at a selected time, e.g. during load handling. The flexible fastening enables the breaking of the optical distance measuring device to be prevented. Although measurements may be made when the grabber is subjected to impacts, for example, and a measurement error caused by an impact may be corrected, it is also possible not to make measurements during an impact or to disregard the measurements made during one. Missing measurement results for the duration of an impact, which is typically in the order of about 0.5 seconds, are manageable in load handling operations.

With prior art optical distance measuring devices the only possibility is to place the device on the fixed structure side of the crane, i.e. at the main girder, for example, to protect the optical measuring device against impacts. A plurality of embodiments disclose solutions in which the optical distance measuring device may be installed also to a grabber swaying on ropes, i.e. on a level of the load handling device, such as a crane, that is "lower by one structural group". In that case the optical distance measuring device is closer to the load to be monitored and discerned, such as a container.

Figure 1:
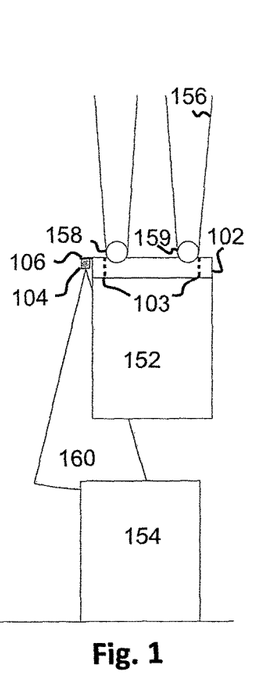
FIG. 1 shows load handling with a grabber having an optical distance measuring device fastened thereto, in accordance with an embodiment.

FIG. 1 shows load handling with a grabber 102 having an optical distance measuring device 104 fastened thereto, in accordance with an embodiment. The optical distance measuring device is preferably fastened to a corner piece 103 of the grabber. In FIG. 1 the grabber corner pieces 103 are illustrated as portions separated by broken lines at an end beam of the grabber. A typical grabber comprises two end beams whose distance from one another may be adjusted for fastening to containers of different lengths. The adjustment of the distance between the end beams may be carried out by a telescopic structure, for example, known in the art. The grabber is typically used for handling loads 152, 154, such as containers, of a fixed size. A grabber of this type is called a spreader. A spreader may be adjusted to grab containers of different lengths.

The optical distance measuring device may be a laser scanner transmitting laser beams in a measuring direction and measuring the distance to objects in the measuring direction on the basis of laser beams reflected by them. The measurement may be based on measuring the time of travel of a transmitted and reflected laser beam. The measuring directions may comprise a plural number of laser beam transmission directions that may be determined as transmission angles of the laser beams.

The fastening between the load and the grabber may be provided in various ways. For a coupling between a spreader and a container to be provided, the corner pieces of the spreader comprise corner locks arranged to fasten to the container corners in a conventional manner and locked in place when the spreader is above the container and the corner locks are at each respective corner.

Load handling may comprise a number of actions, including transfer of the load in a vertical, horizontal or depth direction, in the area where the load is to be handled. Vertical and horizontal movements may be provided by a grabber and a crane to which the grabber is installed. A vertical movement of a load is usually provided by the grabber, either by lifting the load or by lowering it. A horizontal movement of a load may be carried out by a trolley, as in a gantry crane, for example, in which the grabber ropes are fastened to a trolley moving on a bridge. A movement in a depth direction may be carried out by a movement of the entire crane in the handling area of the load.

FIG. 1 shows a grabber that has grabbed a container 152 and the container has been lifted in the air by ropes 156 fastened to fastening points 158 and 159 of the grabber. A container is lifted typically when it is handled, for example stacked or lifted onto the ground or on top of other containers 154. A grabber movement in a horizontal and/or depth direction is achieved by a crane to which the grabber has been installed. Examples of this type of a crane comprise a boom crane, bridge crane, container crane or gantry crane provided with a grabber.

The grabber comprises an optical distance measuring device 104 and fastening means 106 that fasten the optical distance measuring device 104 so that it moves with the grabber. The optical distance measuring device may comprise a device that transmits optical signals, such as laser beams, and measures distances from reflected optical signals. An example of the device in question is a laser scanner that transmits laser beams to a plurality of different directions. The transmission directions of the laser beams are determined by an opening angle 160 inside of which the transmission directions of the laser beams may be selected. In the opening angle, laser beams may be transmitted in different transmission angles. The distance between transmission angles next to each other determines the resolution of the distance measurements in the opening angle. Different transmission angles for laser beams are typically produced by a rotating mirror of the laser scanner, the mirror directing laser beams in transmission angles located in a sector determined by the opening angle. The distance between transmission angles next to each other may be 0.25 degrees, for example. Distance measurements on the entire area of the opening angle are obtained by a mirror rotation during which the mirror directs laser beams to all transmission angles of the opening angle. This type of distance measurement is usually referred to as laser scanning.

According to the disclosed embodiments, the optical measuring device may serve to provide distance data in the grabber to determine the distance to a container to be handled or the distance to objects, such as containers, around the container to be handled or the grabber. The distance data may be used for driving the grabber and the crane comprising the grabber in a container terminal or in another area or in premises where containers are kept or through which containers are transported. Handling of the distance data and subsequent control of the crane and/or the grabber together with the required connections for communicating the distance data and for controlling the crane may be implemented by means known to a person skilled in the art, which is why they are not further discussed in this context.

According to an embodiment, an optical distance measuring device is used for measuring distances at an opening angle that is pointed downwards and to measure distances from a vertical surface and from objects located next to a vertical surface in the opening angle. Naturally, if there are no objects next to a vertical surface in the opening angle of the optical distance measuring device, distances to such objects cannot be measured. FIG. 1 illustrates a measuring situation in which the opening angle of the optical measuring device is directed downwards. The optical measuring device measures a vertical distance between a container 152 to be lifted and another container 154 underneath the container to be lifted. A vertical surface, i.e. a side of the container to be lifted, is located in the opening angle and, thus, distances to the vertical surface may be measured. It is advantageous to the arrangement that the optical distance measuring device 104 may be spread as far as possible in a lateral direction (to the left in the figure) to ensure that the directions of measurement, i.e. a cone, determined by the opening angle 160 of the optical measuring device sweep sufficiently the side wall of the container 152.

For example, the following dimensions are used at a container yard: container width of 8 feet, i.e. 2438 mm, a gap of about 400 mm between containers, a truck lane of about 4500 mm between containers. Since the gap between containers is limited, e.g. 400 mm as mentioned above, there is a limited space lengthwise between the containers and at the end of the containers available for how far the optical distance measuring device may extend to the side of the grabber without hitting an adjacent container.

Figure 2:
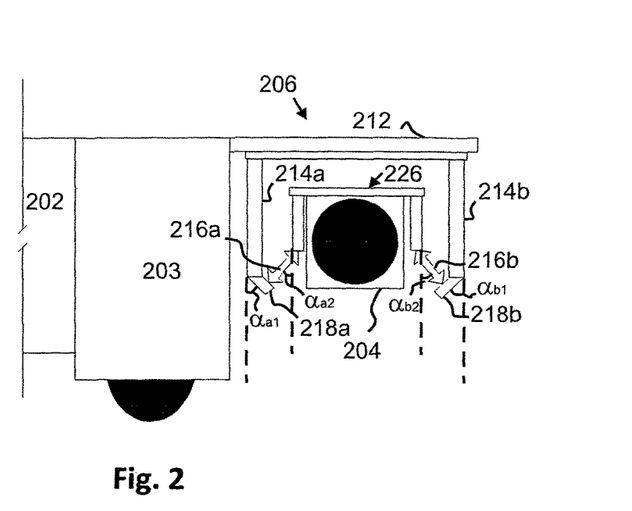
FIG. 2 shows a grabber part comprising fastening means for fastening an optical distance measuring device to the grabber, in accordance with an embodiment.
Figure 3A:
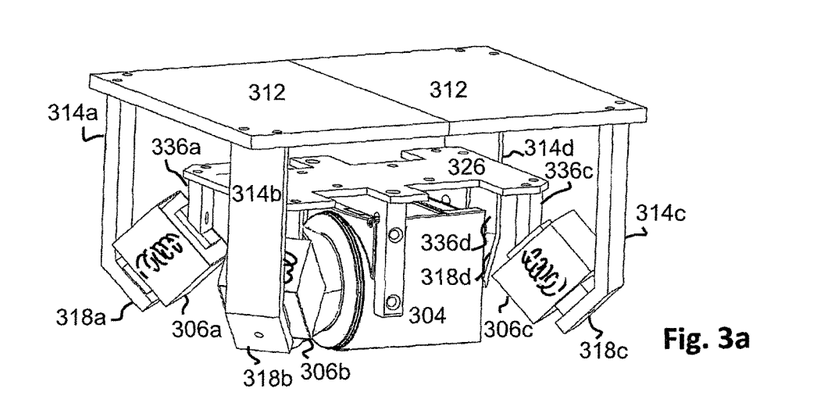
FIGS. 3a, 3b and 3c show fastening means for fastening an optical distance measuring device to a grabber, according to an embodiment.
Figure 3B:
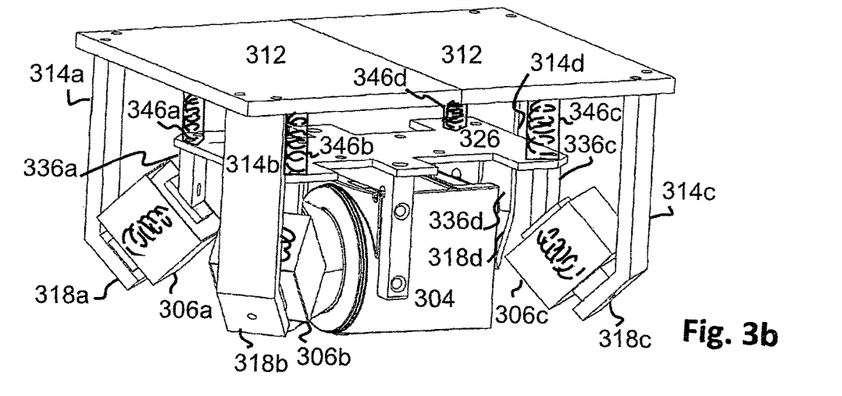
Figure 3C:
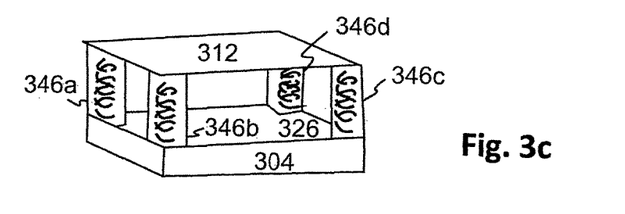

FIG. 2 shows a grabber part 202 comprising fastening means 206 for fastening the optical distance measuring device 204 to the grabber, in accordance with an embodiment. Similarly as in FIG. 1, also in FIG. 2 the grabber and the optical distance measuring device 204 are shown from the front, i.e. the shortest, side of the grabber. The direction of horizontal load handling is illustrated by a line formed by an upper part 212 of the fastening means and the grabber. The direction of vertical handling load is illustrated by broken lines in connection with angles $\alpha_{a1}$, $\alpha_{a2}$, $\alpha_{b1}$, $\alpha_{b2}$. FIGS. 3a, 3b and 3c show fastening means for fastening the optical distance measuring device to a grabber, according to some embodiments. In FIGS. 3a, 3b and 3c the optical distance measuring device 304 and the fastening means 306a-c and 346a-d are shown three-dimensionally to illustrate the support on different sides of the optical distance measuring device. The fastening means of FIGS. 3a, 3b and 3c may be used in the embodiments of FIGS. 2 and 1.

The following embodiments are disclosed with reference to both FIGS. 2 and 3a. The optical distance measuring device is fastened in a flexible manner to the grabber by flexible parts 216a, 216b, 306a-c, such as springs. Since the flexible parts attenuate vibrations and impacts acting on the grabber, malfunction of the optical distance measuring device fastened to the grabber may be prevented. The optical distance measuring device may be sensitive to malfunction due to vibration and impacts. Laser scanners with a rotating mirror, in particular, are known to break easily. It is to be noted that vibration and impacts may also damage optical distance measuring devices with no rotating mirror. The damages in question may appear as loosening of mechanical fastenings, such as screws or bolts, and/or as detaching of electrical couplings. Attenuation of vibration and impacts allows malfunction of the optical distance measuring device, such as a laser scanner, to be reduced or even prevented.

The optical distance measuring device attaches to the grabber by fastening means that are fastened to an end beam, such as the corner piece 203, of the grabber. The grabber may comprise two, three, four or more distance measuring devices, each fastened to a separate corner piece. Distance measuring devices may be fastened also to other locations on the grabber, and a plurality of distance measuring devices may be fastened to one corner piece. The optical measuring devices may be fastened to their particular location substantially as disclosed in FIG. 2.

A distance measuring device comprises opposite sides, one of which is closer to a corner piece of the grabber in a horizontal direction while the other is further apart from the corner piece. The optical distance measuring device is flexibly fastened to fastening means on both the opposite sides. This allows vibrations of and impacts to the grabber caused by load handling to be uniformly attenuated on both sides of the optical measuring device, the accuracy of the distance measuring being as steady and constant as possible in the entire opening angle.

According to an embodiment, the flexible support of the optical distance measuring device is possible by fastening means that comprise a top part 212, 312 and at least two vertical support parts 214a, 214b, 314a, 314b, 314c, 314d extending downwards from the top part and having flexible parts 216a-b, 306a-c at their bottom ends, the optical distance measuring device 204 being fastened to the fastening means 206 by said flexible parts. The top part may be horizontal, for example, in which case the top part and the support parts together form a structure in the shape of an inverted U as in the fastening means of FIGS. 2 and 3a, for example. Since the inverted U-shaped structure opens downwards, which is the direction where the containers to be handled are in relation to the grabber, the optical distance measuring device allows distances to be measured from containers to be handled and from their immediate environment.

The top part 212, 312 of the flexible support is substantially parallel with the main structural direction of the grabber, and the side of the flexible support is parallel with the grabber side, the flexible support being convenient to fasten to the end surface of the grabber by side fastening. Another fastening alternative is that the grabber is slightly wider and longer, in which case fastening to the underside of the grabber is possible. In the fastening of the flexible support the top part of the flexible support or the underside of the grabber forms an overhead protection, i.e. "a roof" for the optical distance measuring device and for the flexion devices selected for its mass. If checks and repairs in the structures of the crane above are made, the sensitive devices are thus protected against any objects falling from above. In addition, the structure provides a whether shield against snow and ice, for example.

The flexible parts may comprise springs, for example, as illustrated in FIG. 3a by broken lines inside the boxes. Although casing of the springs is not indispensable, it helps to prevent dirt, formation of ice and/or corrosion. Examples of applicable springs comprise: coil springs, bending springs or compressible material, such as rubber. A bending spring may be of bent and/or twisted wire. The rubber may preferably be subjected to a shearing stress load in the direction in which vibration is to be attenuated.

The support parts are preferably lower down than the optical distance measuring device, the weight of the optical distance measuring device resting on the flexible parts when the flexible parts are placed between the optical distance measuring device and the support parts. When the optical distance measuring device is in the receiver part 226, the support parts preferably extend further down in the vertical direction than the receiver part that contains the distance measuring device because the flexible parts may then be placed between the receiver part and the support parts so that the weight of the optical distance measuring device is placed on the flexible parts. When the support parts are lower than the body of the optical distance measuring device or the receiver part, the weight of the optical distance measuring device rests at least partly on the flexible parts and thus vibrations and impacts transmitted by the grabber are attenuated.

According to an embodiment, the fastening means 206, 306a-c, comprise at least the top part 212, 312 and three, four or more support parts 214a, 214b, 314a-d extending downward in a vertical direction and surrounding the optical distance measuring device 204, 304 in a horizontal direction. The support parts surrounding the optical distance measuring device are preferably evenly spaced so that the attenuation by the flexible parts fastened to the support parts is evenly directed to the distance measuring device. The support parts may be evenly placed around the optical distance measuring device also e.g. by placing the support parts to the corners of the optical distance measuring device. The spaces between the support parts are preferably chosen according to the length of each side of the optical distance measuring device. When the support parts are at the corners, the attenuation of a flexible part fastened to each support part is distributed to the sides forming the corner of the optical distance measuring device.

According to an embodiment, the flexible parts 216a-b, 306a-c at angles $\alpha_{a2}$, $\alpha_{b2}$, e.g. at an angle of 45 degrees, to the vertical. Hence the weight of the optical distance measuring device may be supported to the flexible parts so that the flexible parts attenuate both vertical and horizontal forces directed from the grabber during load handling due to grabber vibration or impacts, for example.

According to an embodiment, the ends of the support parts comprise alignment parts 218a-b, 318a-d at an angle $\alpha_{a1}$, $\alpha_{b1}$ different from zero, e.g. at an angle of 45 degrees, to the vertical, the flexible parts 216a-b, 306a-c being fastened to the alignment parts 218a-b, 318a-d between the distance measuring device and the alignment parts 218a-b, 318a-d. The flexible parts can thus be supported at an angle other than zero in relation to the vertical without separate adjustment pieces between the flexible parts and the support parts.

According to an embodiment, the fastening means further comprise a receiver part 226, 326 to which the optical distance measuring device 104, 204, 304 is fastened and the receiver part 226, 326 comprises downward extending support parts 336a, c, d at the bottom ends of which the receiver part 226, 326 fastens to the flexible parts 216a-b, 306a-c. The bottom ends of the support parts of the receiver part may be arranged to the same angle in relation to the vertical as the aligning parts 318a-d of the fastening means. This makes it possible to fasten the flexible parts to a desired angle between the receiver part and the fastening means without separate adjustment pieces or changes to the flexible parts themselves.

The flexible part used in the different embodiments has preferably a main direction of operation in which the received forces are attenuated. When the flexible part is set at an angle different from zero in relation to the vertical, e.g. by using aligning parts in the fastening means of the optical distance measuring device and/or arranging the support parts to the receiver part of the optical distance measuring device to the same angle in relation to the vertical as the aligning parts 318a-d of the fastening means, the attenuation capacity of the flexible parts can be used as fully as possible for attenuating vibration and impacts transmitted from the grabber.

In the different embodiments the fastening means, the receiver part of the optical distance measuring device may be formed of one or more parts that may be joined together by welding, screws, bolts, rivets, gluing and/or using other methods known by a skilled professional for joining pieces together. Likewise, the fastening means mentioned above may be used for installing the fastening means to the grabber.

It is to be noted that in FIG. 3a some of the support parts 314a-d, the aligning parts 318a-d, the flexible parts 306a-c and the support parts 336s, 336c 33d of the receiver part may be out of sight or only partly visible because of the 3D view of the structure. However, the receiver part 326 is fastened by four similar arrangements to the fastening means, each of the arrangements being at a corner of the receiver part of the distance measuring device, around the optical distance measuring device. Each of the four arrangements joins the optical distance measuring device to the top part of the fastening means and thus to the grabber. Each arrangement comprises a support part, aligning part and flexible part that are joined and a receiver part to the support part. The receiver part and the optical distance measuring device are preferably aligned so that their corners coincide and thus attenuation acts on the corners of the distance measuring device.

FIGS. 3b and 3c show fastening means for fastening the optical distance measuring device to the grabber, the fastening means 346a-d being set between the top part 312 and the receiver part 326. The rest of the objects in 3b and 3c correspond to those shown in FIG. 3a. The fastening means 346a-d of FIG. 3b may be the flexible parts, as described above in the disclosure of the embodiments relating to FIG. 3a. In FIGS. 3a and 3b the top part may be fastened to the grabber, in which case the optical distance measuring device fastened to the receiver part may measure downward distances, where the load, such as a container, is typically located or in which direction the load, such as a container, is typically moved by the grabber. In other words, the flexible parts of FIG. 3b between the top part and the receiver part attenuate forces particularly in the directions of movement of the grabber. It is to be noted that when the flexible parts are placed between the receiver part and the top part, support parts 214*a*, 214*b*, 314 *a-d* may be entirely or partly disposed of, which simplifies the structure and, as regards manufacturing of parts, reduces the need for manufacturing parts with non-rectangular surfaces. FIG. 3*c* shows this kind of simplified structure.

On the other hand, the optical distance measuring device may be fastened with flexible parts that comprise support parts 214*a*, 214*b*, 314 *a-d* supporting the flexible parts so that the flexible parts act at an angle different from zero, e.g. at an angle of 45 degrees, in relation to the directions of movement of the grabber, and the flexible parts 346*a-d* between the top part and the receiver part, as shown in FIG. 3*b*. This allows the attenuation of the optical distance measuring device to be improved in the directions of movement of the grabber, and also the lateral forces acting on the optical distance measuring device to be attenuated.

The main compression or direction of flexibility of the flexible parts 346*a-d* is mainly vertical. When a sufficiently long vertical flexibility is selected, a sufficient lateral flexibility characteristic is also obtained. It is also possible to place flexible parts at mutually crossing directions of flexibility. Parts that are horizontally flexible may be placed in the space between the top part 312 and the receiver part 326 without an essential or any increase in the main dimensions.

FIG. 3*c* shows an embodiment in which the fastening means for fastening the optical distance measuring device comprise flexible parts 346*a-d* placed between the top part 312 and the receiver part 326. A difference to the solution shown in FIG. 3*a* is that the flexible parts 306*a-c* and the support parts 314*a-d*, 318*a-d*, 336*a-d* associated therewith have been left out, which allows for a smaller fastening of the optical distance measuring device with the grabber. In that case, also the top part 312 may be dimensioned smaller. Moreover, the outer dimensions of the entire structure can be made smaller, and the measuring arrangement can be moved further away from the grabber in the lateral direction. Thus, more directions of measurement further away from the surface of the load, such as a container, are obtained in the opening angle of the optical distance measuring device in the restricted space available at the container side. The disclosed fastening of the optical distance measuring device that saves space in the lateral direction is advantageous in container yards with little space, typically about 400 mm, between the containers.

By using the flexible parts between the top part and the receiver part for fastening the optical distance measuring device, the structure can be made simple and, as regards manufacturing of parts, manufacturing of parts with non-rectangular surfaces can be reduced.

Figure 4:
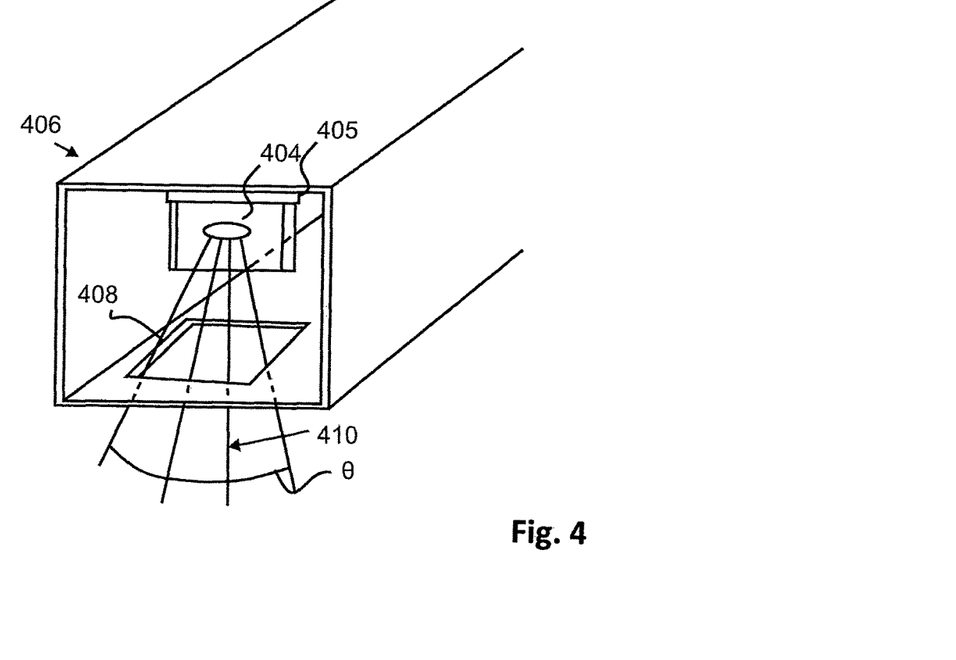
FIG. 4 is a 3D view of the fastening of an optical distance measuring device.

FIG. 4 shows how the optical distance measuring device 404 is placed inside a steel structure 406 of a relatively strong construction. The structure may be an end beam of the grabber or a weather shield. The optical distance measuring device may be flexibly fastened to the steel structure, e.g. by the fastening means disclosed in FIG. 3 or 2. The fastening means may be fastened to the steel structure by methods known to a skilled professional, e.g. by welding, screws, bots, rivets, or gluing. Placing the optical distance measuring device inside a steel structure provides a number of advantages. The device is efficiently protected against impacts from above and from the sides. A laser beam 410 may be directed to a desired and restricted sector θ when the structure is provided with a restricting window 408. The restricting window 408 may be precision-cut by gas cutting, for example. If the width or direction of the laser beam is to be adjusted at the same time with installation, it is possible to install to the edges of the restricting window plates 509, 510, illustrated in FIGS. 5*a* and 5*b*, sliding on the plane of window. With the sliding plates the size of the window may be adjusted and the plates may be installed separately to each edge. In addition, since the installation depth of the laser beam may be selected as desired, the opening central angle of the beam may be adjusted narrower or wider. The sliding plates may be installed outside the steel structure, as shown in FIG. 5, but, if desired, they may also be installed inside the steel structure, which provides an advantage in that water, snow or ice cannot collect on the plate.

With a further reference to FIG. 4, a positioning piece 405 of a desired height may, in practice, be placed between the optical distance measuring device and the inside of the steel structure, the height being used for setting the distance of the optical distance measuring device to the restricting window.

The steel structure may be made of an RHS beam or some other steel casing that may be used for manufacturing the grabber, for example. In addition to the restricting window, an end of the casing may be provided with an open opening for installing the optical distance measuring device so that its installation and servicing would be possible. The opening may be covered after installation and adjustment so that effects of the weather and natural phenomena, such as water, ice, snow, pollen and/or UV radiation of the sun, would not disturb the operation of the optical distance measuring device. FIG. 4 shows a grabber with an optical distance measuring device of an embodiment, with its servicing opening open.

Figure 5A:
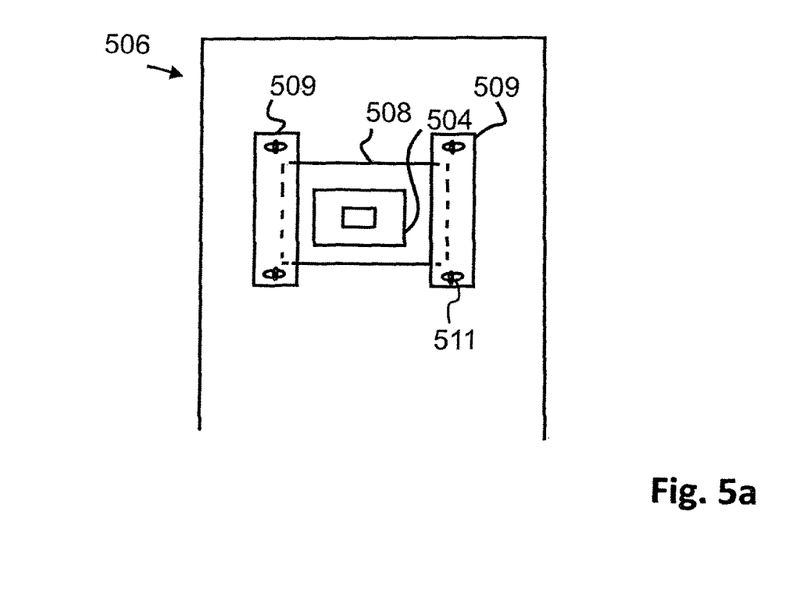
FIGS. 5a and 5b are 2D planar views seen from below of the fastening of an optical distance measuring device.
Figure 5B:
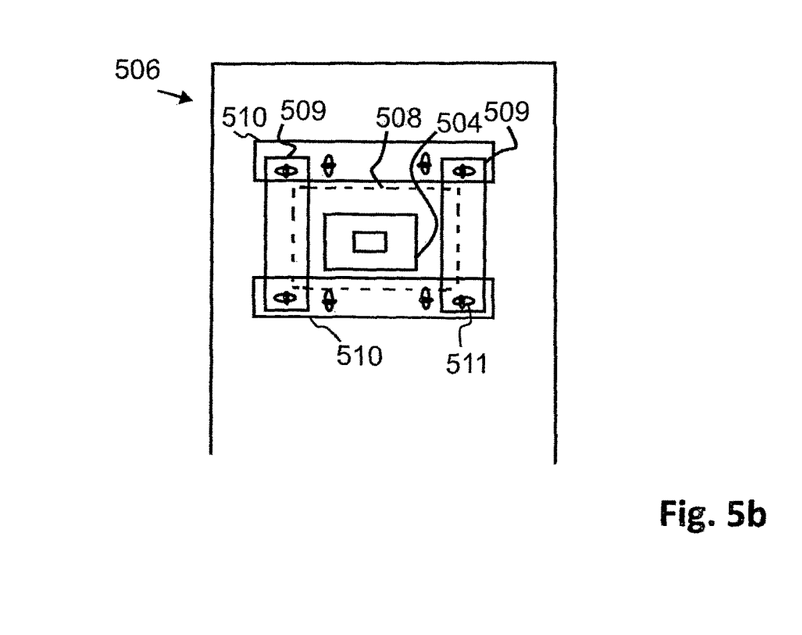

FIGS. 5*a* and 5*b* show a restricting window 508 in a steel structure 506, provided with an optical distance measuring device 504, as a plane view from below. The structure may be an end beam of the grabber or a weather shield. The restricting window may be located at a small distance from the end of the structure so that impacts from the side or the end are preferably directed to the steel structure than directly to the device to be protected. The opposite edges of the restricting window are provided with sliding plates for adjusting the size of the window, as disclosed above with reference to FIG. 4. The optical distance measuring device of FIGS. 5*a* and 5*b* may be placed into the steel structure as shown in FIG. 4. The restricting window may be provided with movable plates 509 that restrict the opening angle of the optical distance measuring device in one direction, e.g. in the width or length direction, as shown in FIG. 5*a*. On the other hand, the restricting window may be provided with movable plates 509, 510 that restrict the opening angle of the optical distance measuring device in mutually transverse directions, e.g. in the width direction and length direction, as illustrated in FIG. 5*b*. In FIGS. 5*a* and 5*b* the movable plates are provide with screw slots and screws 511 for fastening the plates to a desired location to provide a desired window size.

The movable plates of FIGS. 5*a* and 5*b* allow the directions of measurement, i.e. the cone, of the optical distance measuring device to be restricted. In that case the opening angle of the optical distance measuring device may be kept the same, but with the movable plates outside the optical distance measuring device the measurements made with the optical distance measuring device of the load to be handled are restricted to a specific opening angle range. On the other hand, the movable plates may be used for protecting the optical distance measuring device against rain and/or impacts particularly in directions in which the movable plates do not restrict the cone.

Figure 6:
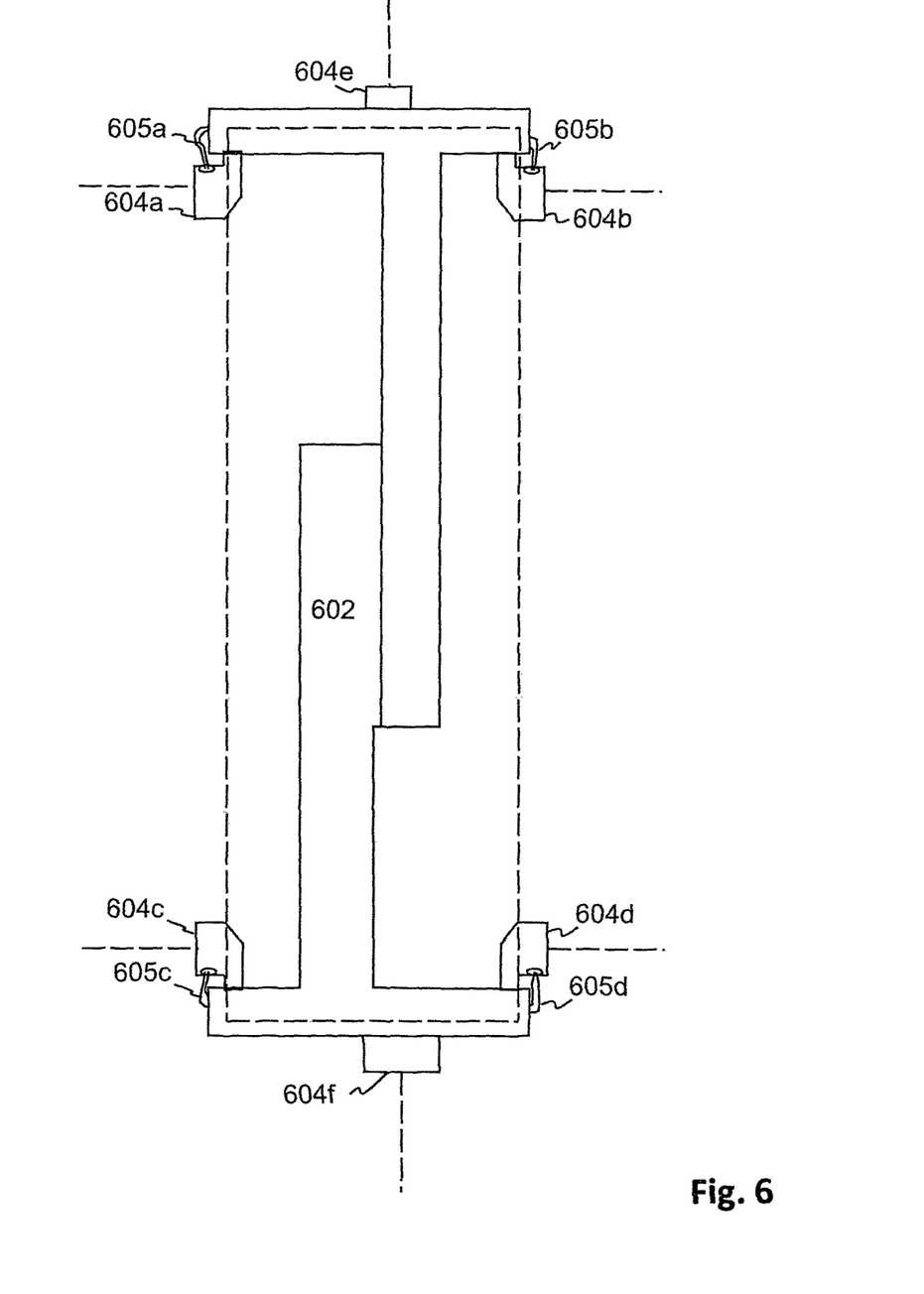
FIG. 6 shows load handling with a grabber in accordance with an embodiment.

FIG. 6 illustrates load handling by a grabber 602 according to an embodiment. The grabber comprises optical distance measuring devices 604*a-f* fastened to the grabber in a flexible manner as described in several embodiments. The rectangle formed by broken lines illustrates the shape of the container to be handled by the grabber. The directions of measurement of the optical distance measuring device are set in accordance with the container shapes so that adjacent containers, in particular, may be detected. The directions of measurement of the optical distance measuring devices are illustrated in the figure by broken lines extending from the optical distance measuring devices.

The directions of measurement, i.e. the cones, of the optical distance measuring devices preferably extend to a larger area away from the container in a lateral direction than towards container. This is illustrated by the opening angle of FIG. 1, in which opening angle directed to the container the cone hits a container side tangentially.

As illustrated in FIG. 6, one optical distance measuring device is preferably fastened to each corner of the grabber and one to each end. The optical distance measuring devices preferably comprise a weather shield illustrated in FIGS. 7 and 8. The cabling 605a-d of the optical distance measuring devices may be brought from the grabber through an opening provided in the weather shield for the cabling. Thus the total number of optical distance measuring devices of the grabber arrived at is six, which allows distances to be measured with precision on the sides and both ends of the grabber. From the point of view of use of space and directions of measurement and weather shielding, it is preferable to provide separate left- and right-handed weather shields that also allow measurements to be made under weather shield at the grabber ends, without a separate version having to be provided for them. A right- and left-handed weather shield may be combined to provide a weather shield to be used at a grabber end. The optical distance measuring device is preferably protected against weather so that rain, for example, would not disturb the operation of the sensor. The weather shield may also protect the optical distance measuring device against direct impacts.

Figure 7:
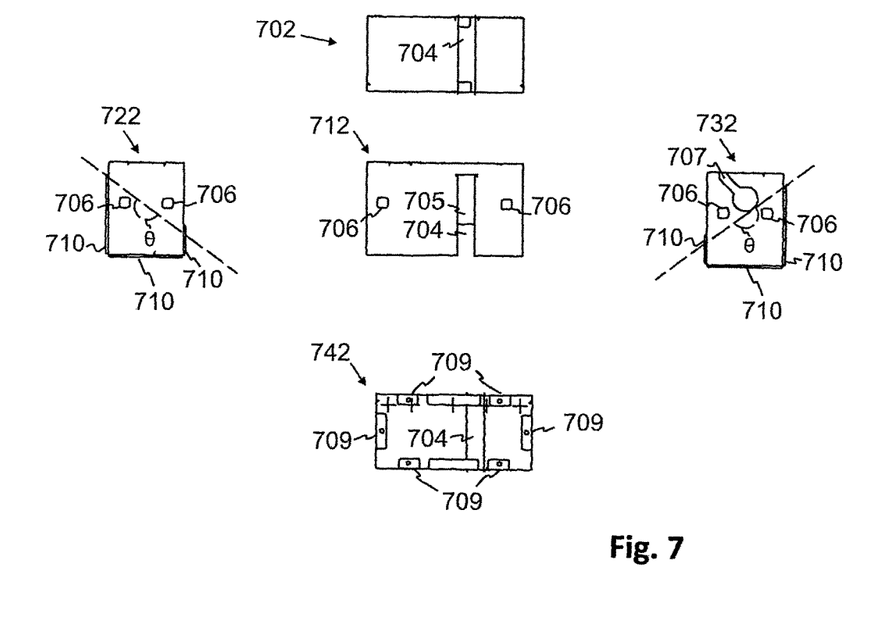
FIG. 7 shows a weather shield according to some embodiments.

FIG. 7 shows a weather shield according to some embodiments. The weather shield may be a structure, e.g. made of steel, as described above, into which the optical distance measuring device is placed. The weather shield is described from below 702, from the ends as end views 722, 732, from the side 712 and from above 742. The weather shield preferably forms a casing around the optical distance measuring device. The casing may have the shape of rectangular prism. The weather shield may be fastened around the optical distance measuring device by screws, the weather shield being thus removable from the optical distance measuring device by opening the screw joints and pulling the weather shield downwards, for example. The view from above 742 the weather shield illustrates weather shield parts 709 to which the fastenings with the grabber may be implemented. The weather shield is preferably of stainless or acid-proof steel plate. The weather shield protects the optical distance measuring device against the effects of weather, such as rain, and direct impacts.

The weather shield is provided with a narrow opening 704 of a constant width for directing the opening angle θ of the optical distance measuring device for carrying out distance measurements. When the optical distance measuring device is used for measuring objects, such as a container, under the grabber, the optical distance measuring device and the weather shield may be fastened to the grabber so that the opening mostly opens in the direction of 6 o'clock, and the opening angle of the optical distance measuring device is directed to the opening to measure distances to objects that are underneath the grabber. The opening is preferably asymmetric such that it is wider to the grabber side than to the underside of the grabber, i.e. to the grabber frame, the grabber frame being illustrated by reference numeral 602 in FIG. 6, for example. Hence the optical distance measuring device allows more dimensions to be measured on the side of the grabber, i.e. away from the grabber, which allows measurement results to be obtained from outside the load, such as a container, fastened to the grabber. Moreover, it is possible to direct the optical distance measuring device so that its opening angle is directed on the sides of the grabbers, i.e. away from the grabber and a container possibly fastened to it. Thus, both the directing of the optical distance measuring device and the structure of the weather shield support distance measurements from a desired direction.

The asymmetry of the weather shield opening is illustrated in a side view 712 of the weather shield, in which a side 705 of the weather shield that is opposite to a weather shield side in view, extends further down in the opening 704 than the weather shield side in view. The opening angle θ of the optical distance measuring device is directed so that it extends to a different height on the left- and the right-hand sides of the weather shield when seen from the end of the weather shield. Hence the optical distance measuring device mounted to the grabber and residing inside the weather shield may be directed to measure distances to the side of the grabber, i.e. away from the grabber, when the opening of the weather shield mounted to the grabber is larger to the side of the grabber than to the underside of the grabber. In other words, the end view 722 of the weather shield shows the weather shield fastened to the grabber preferably so that the grabber is on the right-hand side of the weather shield and the measurement opens more to the left-hand side. In other words, the end view 732 of the weather shield shows the weather shield fastened to the grabber preferably so that the grabber is on the left-hand side of the weather shield. The optical distance measuring device thus allows distances to be measured better to the objects on the sides of the grabber when the opening angle is directed to the asymmetric opening of the weather shield.

According to an embodiment, the weather shield comprises openings 706 for expansion of the flexible fastening means of the optical distance measuring device. FIGS. 3a and 3b illustrate flexible fastening means. The openings preferably allow the expansion of the flexible parts 306a-c fastened to the support structures 314a-d of FIG. 3a around the optical distance measuring device. The openings allow the flexible parts to expand outside the weather shield. When in use, a flexible part contracts and expands slightly, and this movement does not necessarily need to take place entirely inside the weather shield. Because of the openings, the expansion of the flexible parts does not have to fit inside the weather shield. To enable a change in the form of the flexible part towards the side, the weather shield is intentionally provided with openings at the location of the change of form towards the side. This allows the outer dimensions of the weather shield to be minimized, and the entire structure to be moved slightly outward to the side in relation to grabber for improved precision and reliability of measurement without, however, a risk of the weather shield colliding with an adjacent container. Hence, comparison with FIG. 1 shows that this allows the optical distance measuring device 104 to be moved slightly more to the left. In order for the measurement and the detection of the container 154 below to be reliable it is thus preferred that the horizontal distance, or the base, between the optical distance measuring device 104 and another optical distance measuring device 104 next to it on the right is as long as possible. This dimension is thus restricted by the width of the grabber/the container and the free space between containers, which is, as stated, about 400 mm per container side.

The positioning of the openings with respect to the travel opening of light beams required by the optical distance measuring device can be implemented so that the openings do not cause a weather stress on the actual optical distance measuring device. The openings provided for the flexible parts are preferably so small and their position is such that the optical distance measuring device is not subjected to weather stress through them.

The opening 704 of the weather shield, through which the opening angle of the optical distance measuring device is directed, is relatively large and widely opening, which is why the opening may almost cut an entire weather shield having the shape of a rectangular prism. The weather shield may be asymmetric so that the left and right long side walls open on different heights, starting from the bottom, for the measurement, the opening angle being directed so that it extends to a different height on the left-hand side than on the right-hand side.

The weather shield may be left- or right-handed, in which case the opening angles of the optical distance measuring devices inside the weather shields of the different versions are directed in the grabber to different directions in relation to the longitudinal axis of the container, and preferably they are directed as mirror images. FIG. 7 shows end views 722, 732 of examples of opening angles in relation to another. The weather shield may preferably be made of thin steel plate walls. The measurement opening in the grabber, on the container side of the asymmetric weather shield, is narrower than on the side facing away from the container. The narrower opening may be implemented for example by providing a lower measurement opening height on the container side than on the side away from the container. Hence the side facing away from the container opens more to the container side and upwards than the container side. This measuring direction is important when the container is handled deep down in a gap with containers stacked on top of each other on both sides, as if the container were handled in a canyon.

The measurement opening is relatively narrow (in the direction of the longitudinal axis of the container), because a narrow opening is sufficient for the measuring beam. The outer periphery of edges 710 is bent to provide a narrow, outward and sideward strip that allows the edge of the opening to be reinforced. This reinforcement also serves to protect against the joint effect of wind and rain, preventing rain, for example, from entering the measurement opening by flowing on the surface of the weather shield. In this case flowing is particularly caused by the rain and wind together, and, moreover, the direction of flow may be other than vertical.

One end of the weather shield is provided with an opening 707 for cabling. The opening 707 may be provided with edge padding or lining to prevent the cabling 605 *a-d* from becoming scratched or worn by the edges of the opening when the grabber is subjected to a shock. In addition, the opening 707 is provided with an oblong slot to allow the weather shield to be detached and re-assembled without cutting or detaching the cabling.

Figure 8:
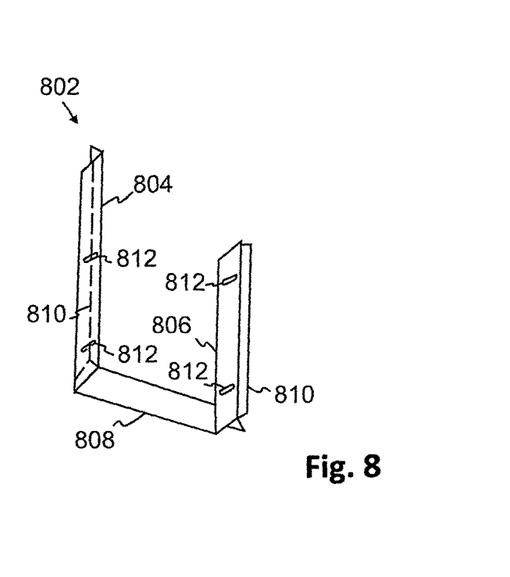
FIG. 8 shows a movable plate for adjusting an opening of a weather shield according to an embodiment.

FIG. 8 shows a movable plate 802 for adjusting the opening in accordance with an embodiment. The opening may be adjusted if the width of a narrow opening, such as the one shown in FIGS. 5*a* and 5*b*, reserved for the laser beam is to be adjusted. With reference to FIG. 8, the plate may be a plate bent into the shape of a letter U, which opens upward as an open jaw. The movable plate is preferably fastened to the weather shield, which is shown in an end view 722 in FIG. 7.

FIG. 8 shows a weather shield which combines the border plates of three 804, 806, 808 prism surfaces joined across two prism corners and a reinforcing fold 810. This fold also forms a flow barrier. Flow may be caused by rain or humidity, for example. The plate thus protects the optical distance measuring device against the effects of weather and restricts the measuring opening to a sufficiently narrow width. Two opposite plates of this kind on both sides of the measurement opening form an enhanced protection against weather stress. Oppositely placed means that two plates are placed side by side so that their folds 810 almost touch each other, and the measuring beam is adjusted to travel between the folds. In other words, the folds 810 of two plates are on both sides of the measurement beam, and together they form three adjacent parallel planes. In addition, two opposite plates allow the measurement opening to be adjusted narrower, in which case measuring results of the optical distance measuring device essential for the grabber may be obtained even from a narrow measurement opening. The border plate bent in the form of letter U is also provided with oblong slots 812 for adjustment screws, the border plate being movable in the direction of the slots. With the plate joined into a single U profile on three sides of the prism, the narrowing of the measurement opening is easy to synchronize to take place simultaneously on all three sides. When the measurement gap in the measurement opening has been adjusted to as narrow as desired, the surface between the border plate and the weather shield may be sealed with a sealing material. Alternatively, the sealing material is first spread between the weather shield and the border plate, the border plates being then adjusted by sliding them in place. An advantage of this arrangement is that the sealing material is under the border plate and thus not subjected to stress by UV radiation from the sun, which allows a long-lasting protection also against flow to be obtained.

According to an embodiment, a weather shield cross-section with five corners has been found to have advantageous properties. The cross-section refers to a replacing pentagon that replaces the shape provided by the rectangular bottom and top shapes 702, 704 in FIG. 7. A solution in a pentagon arrangement occupies less space, the devices inside can be arranged in a compact manner, and it is less prone to collide with adjacent containers. In addition, the pentagon provides a solution that reinforces the structure of the casing better than a rectangular structure. Moreover, tests have surprisingly shown that a laser beam in a pentagon casing produces a better and a more high-quality measurement result than a rectangular casing. This has been shown by measurements although, so far, the underlying reason is not known. The pentagon weather shield is illustrated by references 604*a-d* in FIG. 6.

According to an embodiment, the opening angle of the optical distance measuring device is directed through an opening or a window, the opening or window being in the structure of the grabber or in the weather shield. The openings and windows are illustrated e.g. in FIGS. 5*a*, 5*b* and 7. In the direction of the longitudinal axis of the container and the grabber, the width of the opening or window is less than 35 mm, preferably less than 25 mm, and most preferably less than 15 mm. The width and direction are determined for a measurement directed to the side of the grabber/container. The directions at the end of the grabber/container are naturally turned 90 degrees in relation what was determined for the directions to the side.

Some embodiments have been disclosed above for implementing flexibility in the fastening of an optical distance measuring device to a grabber. It is to be noted that the fastening of the optical distance measuring device is also possible to carry out in various ways so that flexible directions of movement are provided in all operational directions in which shocks that are to be attenuated may occur, i.e. in directions X, Y and Z of the Cartesian co-ordinates set. In addition, the flexible parts or elements do not necessarily have to be placed symmetrically in relation to each other, not necessarily even at precise angles of 45 degrees or 90 degrees to one another. Further still, a flexible characteristic (such as spring constant, compressibility, attenuation depending on impact speed) may be chosen to be different in different directions.

It will be obvious to a person skilled in the art that, as technology advances, the basic idea of the invention may be implemented in many different ways. The invention and its embodiments are thus not restricted to the examples described above, but may vary within the scope of the claims.

The invention claimed is:

1. A grabber for a load handling apparatus, wherein the grabber comprises an optical distance measuring device and a fastener configured to fasten the optical distance measuring device in a flexible manner to the grabber,
wherein the fastener comprises a top part and at least two support parts extending downward from the top part in a vertical direction,
wherein each of the support parts have a bottom end,
wherein a flexible part is fastened at the bottom end of each support part, and
wherein the optical distance measuring device is fastened to the fastener by the flexible parts.

2. The grabber of claim 1, wherein the grabber is adjustable to grab loads of a plurality of different sizes.

3. The grabber of claim 1, wherein the optical distance measuring device comprises at least two sides that are opposite to one another, and
wherein the fastener is fastened to the optical distance measuring device in a flexible manner on each of said at least two sides.

4. The grabber of claim 1, wherein the flexible parts are at an angle different from zero to a horizontal axis defined by a plane of the top part.

5. The grabber of claim 4, wherein the angle is 45 degrees.

6. The grabber of claim 1, wherein each support part bottom end comprises aligning portions that are positioned at an angle different from zero in relation to a vertical axis defined by at least one of the support parts, and
wherein the flexible parts are fastened to the aligning portions between the optical distance measuring device and the aligning portions.

7. The grabber of claim 1, wherein the at least two support parts surround the optical distance measuring device in a horizontal direction.

8. The grabber of claim 1, wherein the fastener further comprises a receiver part fastened to the optical distance measuring device,
wherein the receiver part comprises at least two receiver support parts,
wherein each receiver support part comprises a bottom end that is fastened to the flexible parts.

9. The grabber of claim 1, wherein the grabber is movable in a vertical direction and a horizontal direction, and the flexible parts surround the optical distance measuring device, the flexible parts having a main operating direction in which received forces are attenuated, and
wherein the main operating direction of each flexible part is at an angle different from zero relative to a movement of the grabber.

10. The grabber of claim 1, wherein the flexible parts are aligned to corners of the optical distance measuring device or to corners of a receiver part containing the optical distance measuring device.

11. The grabber of claim 1, wherein the optical distance measuring device is placed inside a grabber structure of the grabber or inside a weather shield, and the grabber structure or the weather shield comprises an opening in an opening angle of the optical distance measuring device, the opening angle being directed through the opening.

12. The grabber of claim 1, wherein the optical distance measuring device is placed inside a grabber structure of the grabber or inside a weather shield, and the grabber structure or the weather shield comprises an opening in an opening angle of the optical distance measuring device, the opening angle being directed through the opening and the opening being provided with one or more movable plates for adjusting the size of the opening.

13. The grabber of claim 1, wherein the optical distance measuring device is placed inside a grabber structure of the grabber or inside a weather shield, and the grabber structure or the weather shield comprises an opening that is bigger to a grabber side than to the underside of the grabber, the opening angle of the optical distance measuring device being directed into the opening.

14. The grabber of claim 1, wherein the optical distance measuring device is placed inside a grabber structure of the grabber or inside a weather shield, and the grabber structure or the weather shield comprises openings allowing the fastener to expand outside the grabber structure or the weather shield.

15. The grabber of claim 1, wherein the optical distance measuring device is fastened to a receiver part and receiver part flexible parts are located between the top part and the receiver part.

16. The grabber of claim 1, wherein the optical distance measuring device comprises a device that transmits optical signals and measures distances from reflected optical signals.

17. The grabber of claim 16, wherein the device is a laser beam.

18. The grabber of claim 1, wherein each of the flexible parts comprise one or more of the following: a coil spring, a bending spring and a piece of compressible material.

19. The grabber of claim 1, wherein the optical distance measuring device comprises a laser scanner with a selector for selecting transmission directions of one or more laser beams.

20. The grabber of claim 1, wherein the grabber comprises one or more corner pieces by which the grabber fastens to a load to be handled, and the fastener configured to fasten the optical distance measuring device is arranged at the corner pieces.

21. The grabber of claim 1, wherein the optical distance measuring device is placed inside a grabber structure of the grabber or inside a weather shield, and the grabber structure or the weather shield comprises an opening of a width of less than 35 mm reserved for a light beam.

22. The grabber of claim 1, wherein the optical distance measuring device is placed inside a grabber structure of the grabber or inside a weather shield, and the grabber structure or the weather shield, when viewed from above, has a cross-section in the shape of a pentagon.

23. A crane comprising the grabber of claim 1.

24. The grabber of claim 23, wherein the crane is a boom crane, bridge crane, container crane or gantry crane.

* * * * *